United States Patent [19]

Spengler

[11] 4,277,996

[45] Jul. 14, 1981

[54] FORCE APPLICATION APPARATUS, ESPECIALLY FOR SEVERING MATERIALS

[75] Inventor: Ernst M. Spengler, Heusenstamm, Fed. Rep. of Germany

[73] Assignee: Stanztechnik GmbH R & S, Bergen-Enkheim, Fed. Rep. of Germany

[21] Appl. No.: 150,073

[22] Filed: May 15, 1980

Related U.S. Application Data

[63] Continuation of Ser. No. 965,907, Dec. 4, 1978, abandoned.

[30] Foreign Application Priority Data

Jun. 3, 1978 [DE] Fed. Rep. of Germany ....... 2824488

[51] Int. Cl.$^3$ .......................... B26D 5/12; B26D 7/10
[52] U.S. Cl. .................... 83/171 Q; 83/170; 83/464; 83/465; 83/519; 83/568; 83/590; 83/639; 83/914; 100/269 A
[58] Field of Search ................. 83/513, 516, 517, 518, 83/519, 588, 590, 639, 914, 454, 465, 466, 170, 171; 100/269 A; 254/93 HP

[56] References Cited

U.S. PATENT DOCUMENTS

| | | | |
|---|---|---|---|
| 2,363,779 | 11/1944 | Duffy | 100/269 A |
| 2,380,152 | 7/1945 | David | 254/93 HP |
| 3,194,096 | 7/1965 | Comet | 83/588X |
| 3,230,812 | 1/1966 | Pucci et al. | 83/639 X |
| 3,410,202 | 11/1968 | Chruhasik | 100/269 A |
| 3,815,464 | 6/1974 | Frost | 83/639 |
| 3,822,627 | 7/1974 | Bianchi | 83/639 |

FOREIGN PATENT DOCUMENTS

| | | |
|---|---|---|
| 520254 | 3/1931 | Fed. Rep. of Germany . |
| 1502167 | 3/1969 | Fed. Rep. of Germany . |
| 491738 | 7/1970 | Switzerland . |

Primary Examiner—J. M. Meister
Attorney, Agent, or Firm—W. G Fasse; D. F. Gould

[57] ABSTRACT

The present apparatus applies force along a line or to a surface through one or more linear or rather longitudinal, elastically expandable or deformable members. The expansion of the elongated member, such as an elastic, reinforced hose or membrane, is transmitted to the tool proper, for example, a strip steel knife or a clamping device, along the entire length of the tool, whereby a linear force application is achieved. Several of such members may be arranged in parallel to obtain substantially a surface area force application. The force application member may also be curved for applying the force, such as a cutting force to an equally curved tool such as a strip steel knife. The force application member is returned to its starting position after a work stroke is completed. The work stroke is performed by expanding the member with the aid of a medium under pressure. The return is accomplished by a spring force or by a similar expansion member.

19 Claims, 16 Drawing Figures

FORCE APPLICATION APPARATUS, ESPECIALLY FOR SEVERING MATERIALS

CROSS-REFERENCE TO RELATED APPLICATION

The present application is a continuation application of U.S. Ser. No. 965,907; filed on Dec. 4, 1978, now abandoned.

BACKGROUND OF THE INVENTION

The present invention relates to a force application apparatus, especially for severing materials. More specifically, the invention relates to a stamping apparatus including power drive means such as pneumatic or hydraulic drive means for at least one tool carrier such as a knife carrier carrying a cutting knife or a strip steel stamping knife. The apparatus may also include counter support means.

Devices of the mentioned type are known in the art in many variations. Where the cutting or force application is to be accomplished along a line, such prior art devices comprise primarily pneumatically operated piston cylinder means which move the knife holder. The structural height of piston cylinder means is substantial due to the nature of such means. Besides, piston cylinder means are limited to applying the force to the knife holder substantially only to points along a line. Where very high forces or loads are to be applied, the knife carrier or the knife is subject to deflections or sagging. As a result, prior art structures require heavy frames and similarly heavy counter support means.

U.S. Pat. No. 4,063,477 describes an apparatus for cutting preshaped carpets in accordance with a given pattern. In a common frame there is arranged a bottom support platen and a top pressing platen. The knives are supported by heavy cross beams which are operated by piston cylinder arrangements.

OBJECTS OF THE INVENTION

In view of the above, it is the aim of the invention to achieve the following objects singly or in combination:

to construct a force application apparatus capable of applying the force truly along a line which may either be a straight line or a curved line in a plane or in space;

to construct a force application apparatus in which the structural height is substantially reduced as compared to similar devices in which the force application is accomplished by piston cylinder means;

to employ as the force application means an elastically expandable hose or membrane which may be disposed in any desired configuration corresponding to the longitudinal configuration of the tool to be operated such as a strip steel knife, counter-holder, clamping member, or the like;

to provide a force application apparatus which is equally suitable for different kinds of uses such as the linear or curved clamping of a work piece, for example to break glass along a scribed or pre-cut groove forming a line or curve; and to provide an apparatus of the described type which is easily retooled for different types of tools so that, for example, knives may be replaced by clamping devices and vice versa.

SUMMARY OF THE INVENTION

According to the invention there is provided an apparatus for applying force to a work piece characterized by rigidly support frame means which in turn operatively support longitudinal, elastically deformable expansion means such as a reinforced rubber hose or a membrane. Elongated force transmission means are operatively arranged in the frame for cooperation with the longitudinal, elastically deformable expansion means. The expansion means are connected to means for deforming the expansion means for performing the work stroke. The means for deforming may comprise port connectors and hose means for supplying and discharging a medium under pressure into and out of the elastically deformable expansion means. The expansion may be accomplished by hydraulic or pneumatic means. In a preferred embodiment the tool carrier is arranged in direct contact with the expansion means or member, whereby the structural height is minimized. The tool carrier member and thus the tool attached thereto, such as a strip steel knife, is displaced in direct response to the deformation or expansion of the expandable member. The force application may be gradual to accomplish a scissor type of cut.

Reset means are provided for returning the expandable member into its starting position. However, if the expandable member itself is sufficiently elastic, reset means may not be necessary for the proper operation of the present apparatus. The reset means may comprise spring means or spring elastic rubber or foam rubber components. Similarly, pneumatically or hydraulically operated expansion members according to the invention may also be used for the resetting, whereby the apparatus would comprise at least two of the present devices.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS ILLUSTRATING THE BEST MODE OF THE PRESENT INVENTION

Figure 1:
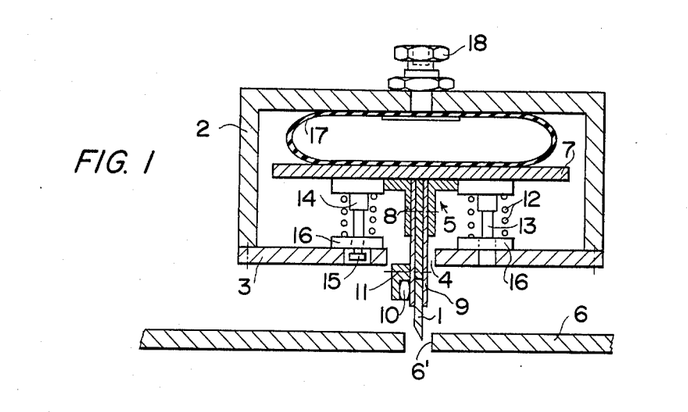
FIG. 1 is a sectional view through an apparatus according to the invention along section line 1—1 in FIG. 2, whereby the apparatus is constructed for severing or stamping of work pieces.
Figure 2:
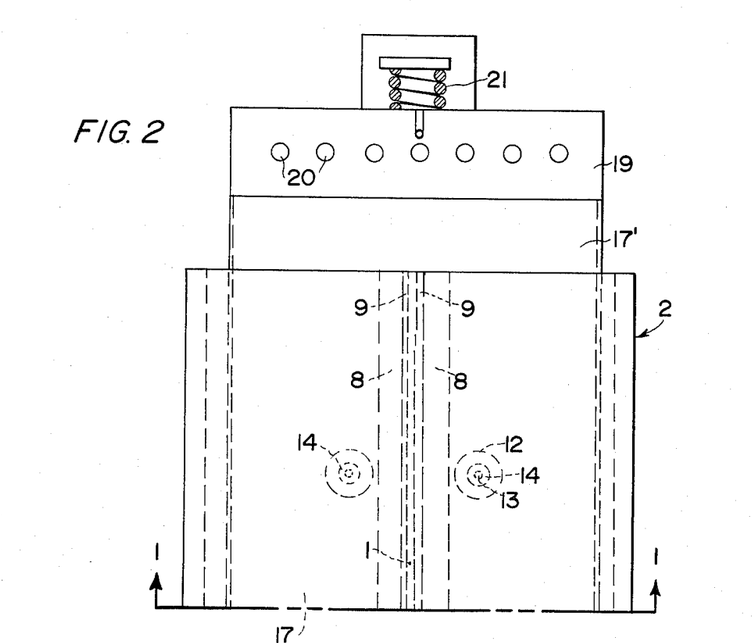
FIG. 2 is a top plan view of an end portion of the apparatus according to FIG. 2, the entire length of the apparatus is not shown since such length may vary in accordance with specific requirements.

FIG. 1 is a sectional view extending substantially along section line 1—1 in FIG. 2. Only those elements are shown which are necessary for the understanding of the invention. The elements required for applying a force to a tool such as a strip steel knife 1 comprise a frame member 2 supported in a machine frame not shown. The frame member 2 has a C-shaped cross section opening, for example, downwardly and substantially closable by a bottom plate 3 provided with a longitudinal slot 4 through which part of the force transmitting means 5 extend. A work piece, such as a piece of carpet (not shown) is supported on counter holder support plate 6 such as a work table into which the edge of the knife 1 may penetrate or the knife 1 may move through a slot 6'. The plate 6 is supported in the main frame structure either in a movable or in a fixed manner as is known in the art.

The force transmitting means 5 comprise a pressure application plate 7 which preferably has a length, as viewed perpendicularly into the plane of the drawing, corresponding to that of the strip steel knife 1. The strip steel knife 1 is secured to the pressure plate 7 by angle members 8 and clamping plates 9, and an electrical heating conductor 10 may be secured alongside the strip steel knife 1 by a clamp 11 for heating the knife, if desired.

The just described force transmission means 5 are supported on reset springs 12 which in turn are carried by guide members 13 and stop members 14. The stop members 14 may be adjustable, for example, by an adjustment screw 15, whereby the extent of the downward stroke of the knife 1 may be limited when the lower shoulder of the stop member 14 contacts a plate 16 on its downward movement. The guide members 13 are guided in the plates 16. According to the invention there is arranged a longitudinal, elastically deformable expansion member 17 between the pressure plate 7 and the inner surface of the frame member channel 2. Means for elastically deforming or expanding the member 17 comprise pipe or hose connectors 18 which connect the space inside the member 17 to a pressure source such as a hydraulic or pneumatic pump not shown.

Incidentally, the support plate 6 may also be constructed as a work piece hold down component which would rest on a support table not shown, whereby the work piece would be interposed between the hold down member 6 and the support table.

FIG. 2 shows how one end 17' of the deformable expansion member 17 is closed by a clamp 19 which may be provided in the form of two plates held together by screws 20. Each end of the hose 17 is clamped closed in a pressure tight manner. Only one end is shown in FIG. 2. A spring 21 is arranged so that the expandable member 17 is longitudinally stretched when the pressure inside the member 17 is relieved. Both springs 21 at each end of the member 17 cooperate in the stretching of the member 17 when the latter is not under internal pressure.

Incidentally, it has been found that a reinforced hose of the type commonly used in fire fighting equipment is suitable for the present purposes.

A stop for limiting the stroke of the knife could also be provided by permitting the guide members or rods 13 to contact the counter holder or hold down means 6 through respective apertures in the bottom plate 3.

In operation the springs 12 normally hold the work transmission means 5 and the expandable member 17 in the uppermost position whereby the pressure medium is substantially removed from the volume confined by the expandable member 17. If now, for performing a work stroke, the member 17 is filled with a pressure medium, preferably with a compressible flowing medium, the member 17 expands thereby pushing the pressure plate 7 downwardly against the force of the reset springs 12. The downward movement of the plate 7 is properly guided by the guide rods 13 so that the plate 7 cannot tilt and the plate thus transmits its downward movement to the knife 1. The frequency of the work strokes will depend on the supply and removal of the pressure medium into and out of the member 17.

As mentioned above, the frame member or housing 2 is open at both ends so that the ends 17' may be properly clamped closed in a pressure tight manner.

Upon completion of the work stroke when the stop members 14 contact the respective plates 16, or when the lower free ends of the guide rods 13 passing through the plates 16 contact the hold down member 6, such stopping may be used to control the removal of the pressure medium from the member 17, thereby completing one work stroke.

The shape and configuration of the housing 1 and of the pressure plate 7 as well as of the expandable member 17 may be conformed to any two or three-dimensionally curved strip steel knife 1, whereby such conformity is possible along the entire length of the strip steel knife 1 or other tool member. The cross-sectional shape as illustrated in FIG. 1 remains the same regardless what shape the components of the structure assume. This feature of the invention has the advantage that along the entire length of the tool such as the strip steel knife 1 an absolutly uniform pressure application is assured during the active work stroke. Another advantage of the invention is seen in that the expandable hose member 17 has a rather small diameter relative to its entire length and thus also relative to its surface acting as a pressure surface. Thus, the total structural height may be very small compared to piston cylinder means of the prior art.

Figure 3:
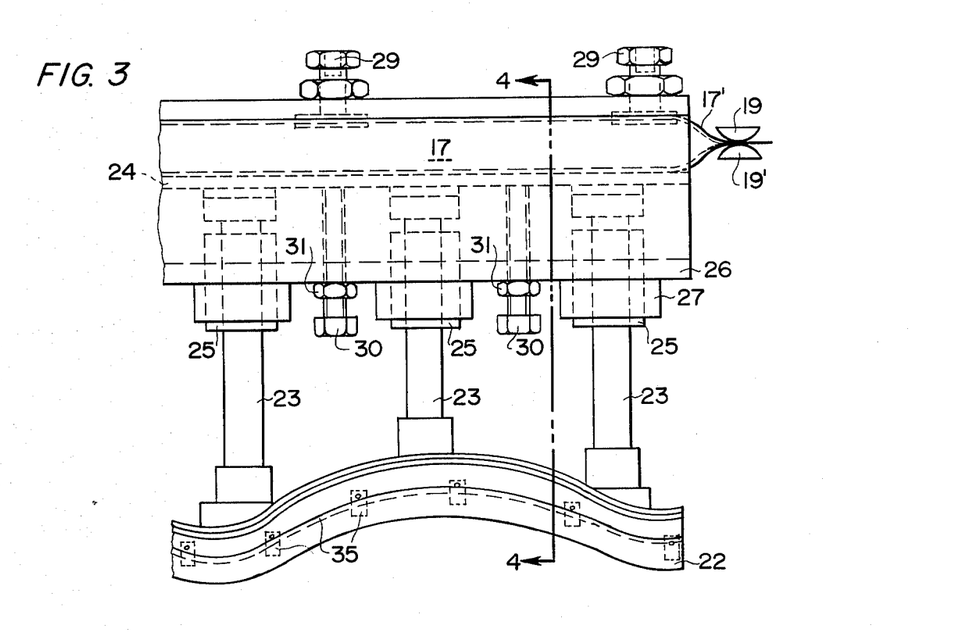
FIG. 3 is a side view of an end portion of an apparatus according to the invention, wherein the force transmitting elements comprise extensions to accommodate a curved tool such as a curved strip steel knife.
Figure 4:
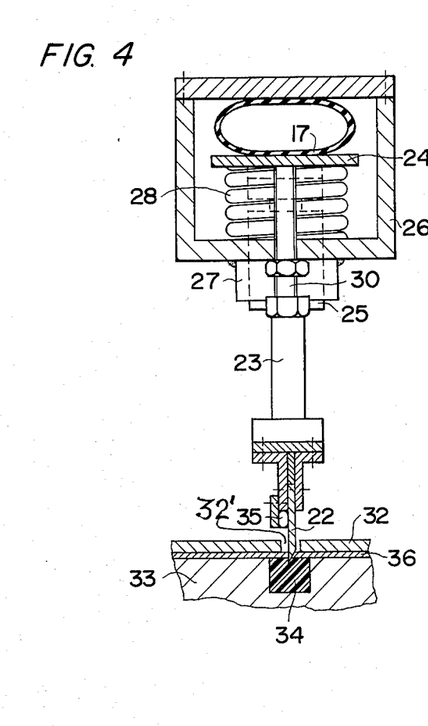
FIG. 4 is a sectional view through the apparatus shown in FIG. 3 along section line 4—4.

FIGS. 3 and 4 illustrate an apparatus similar to that shown in FIGS. 1 and 2. However, the strip steel knife 22 has a curved shape as best seen in FIG. 3. To accommodate this curved shape spacer members 23 are arranged between the pressure plate 24 and the knife 22. The advantage of the spacer member 23 is seen in that it permits the making of cuts in spots which are accessible only with difficulties. The movement of the spacer members 23 is guided by bearing bushings 25 secured to the housing or frame member 26 by sleeves 27 which are, for example, welded to the housing 26 as best seen in FIG. 4. The bearing bushings 25 extend into the housing 26 and are surrounded by reset spring elements 28 not shown in FIG. 3 for simplicity's sake. The springs 28 return the pressure plate 24 and thus the expandable member 17 into a starting position after the member 17 has been subjected to internal pressure by the admission of a pressure medium through ports 29. Adjustable stop means 30 limit the work stroke. These stop means 30 may simply be screws extending through threaded holes in the bottom plate of the housing 26 and cooperating with a counter nut 31 for keeping the adjusted stops in the desired position. As seen in FIG. 3 the pressure plate 24 rests against the upper ends of the stop means 30. Thus, FIGS. 3 and 4 illustrate the maximum downstroke of the knife 22 which is secured to the lower end of the spacer members in a manner similar to that illustrated in FIG. 1 wherein the knife 1 is connected directly to the pressure plate 7.

The upper end of the spacer members 23 is preferably secured to the pressure plate 24 in a flexible or hinged manner so that canting of the spacer members 24 is substantially avoided and their movement in parallel to each other is assured.

The strip steel knife 22 which cooperates with a work piece hold down member 32 resting on a support table 33, and with a counter cushion 34 may be heated by heating means 35, depending on the type of work piece 36 to be cut. The counter cushion 34 may be made of synthetic plastic material such as PVC or TEFLON(RTM). Heating of the knife 22 is advantageous for the cutting, however, in order to avoid overheating of the force transmitting element such as the spacer members 23 and the bearing bushings 25, it is advantageous to supply a cooling medium through the expandable hose member 17 which may be accomplished through the ports 29. Water may be used as a cooling medium which may be removed from the member 17 through further ports not shown. The extent of the filling of the hose member 17 by the cooling medium and the flow speed through the member 17 will depend on the individual operating conditions. The same or similar ports may be used for the supply of the pressure medium. Incidentally, the knife 22 passes through a slot 32' in the hold down member 32.

Figure 5:
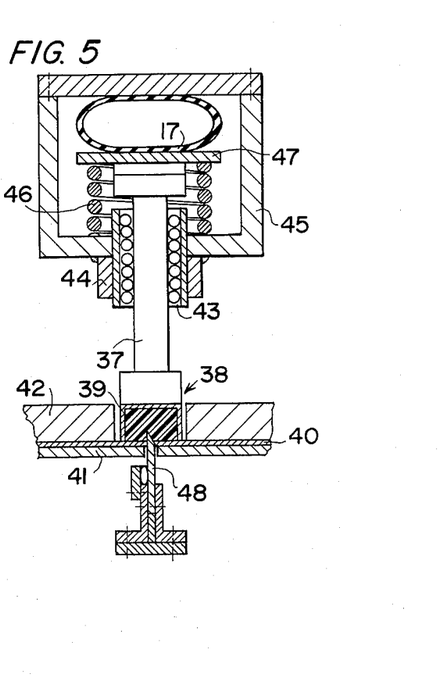
FIG. 5 is a sectional view similar to that of FIG. 4, however, with the modification that the apparatus itself is used as a counter holder device cooperating with a stationary knife or a knife that is supported in a movable manner.

FIG. 5 illustrates a sectional view similar to that of FIG. 4 however, the knife means 37 are stationary at least during the actual cutting and severing. The forces necessary for the severing are supplied through the spacer member 37 the lower end of which is formed as a counter support 38 also comprising a TEFLON strip or the like. The TEFLON strip is inserted in a channel member 39 for easy replacement. The work piece 40 is supported on a table 41 and held down by a hold down member 42. The spacer 37 is guided in a bearing bushing, preferably a ball bearing bushing 43 held in a sleeve 44, for example, welded to the housing 45 of the expandable member 17 which also operates against a reset spring 46 through a pressure plate 47. The stroke limitation in the embodiment of FIG. 5 may also be accomplished by the same means as shown in FIG. 4. The spacer members 23 or 37 may be closely spaced so that a deflection or bending of the strip steel knife or counter holder 38 can be readily avoided which was not possible heretofore because piston cylinder arrangements could not be as closely spaced.

In operation the knife 48 and the support plate 41 provided with a slot for the passage of the knife may be raised and lowered on a lifting table not shown. The components located above the work piece 40, including the counter support means 38, are held in a machine frame of which the housing 45 may form a part. Preferably, the components secured to the housing 45 are exchangeable against similar components or the upper structure with the housing 45 may also be raised and lowered by convention means, whereby the work piece 40 may be brought into the cutting position and removed again from the cutting position in a convenient manner. After insertion of the work piece 40 the upper and lower machine parts are brought into a cooperating position, whereby the cutting edge of the knife merely is brought into contact with the work piece. The actual severing operation take place as soon as the expandable hose member 17 is loaded with a pressure medium such as air under pressure, whereby the counter holder 39 and thus the work piece are displaced against the stationary cutting edge of the knife means 48 sufficiently for the knife edge to enter into the surface of the counter holder cushion in the channels 39. The use of a movable counter holder according to the invention has the advantage that even in those instances where the knife must penetrate the work piece at a substantial angle relative to the surface of the work piece, a proper severing is assured because the knife can penetrate sufficiently into the counter holder and the latter may be moved to the extent necessary.

Figure 6:
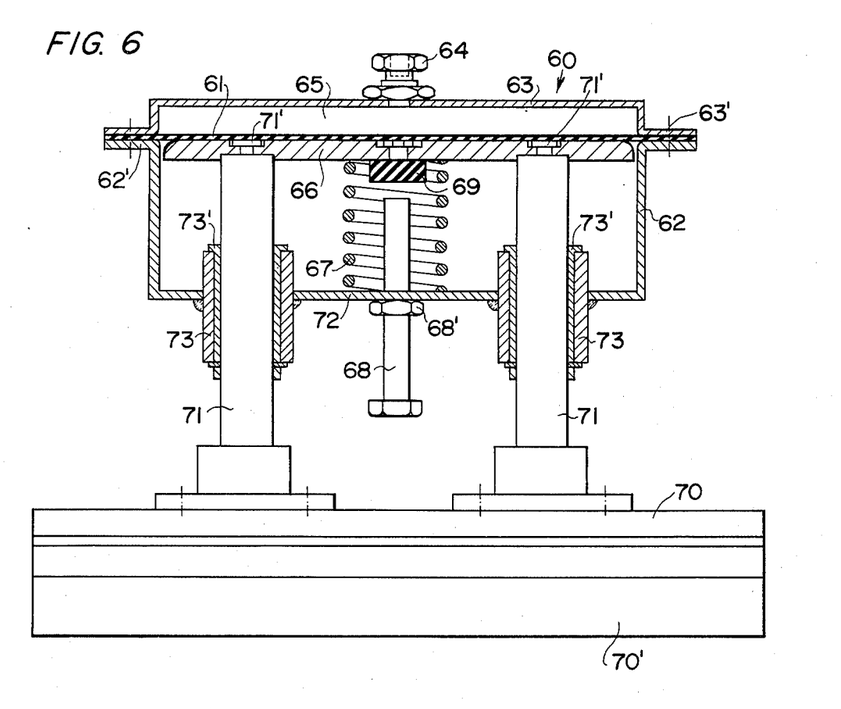
FIG. 6 is a sectional view through FIG. 7 along section line 6—6 and illustrating an embodiment wherein the expandable member is a membrane.
Figure 7:
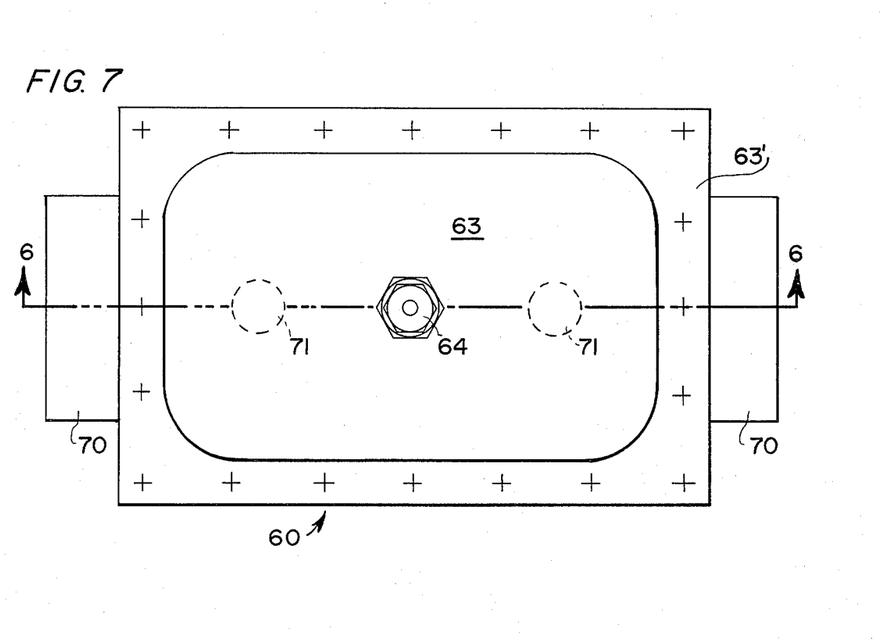
FIG. 7 is a top plan view of the apparatus illustrated in FIG. 6.

FIGS. 6 and 7 illustrate an embodiment 60 of the invention wherein the expandable hose member 17 has been replaced by a flexible, expandable membrane 61 made of rubber or the like. The membrane 61 is clamped in a pressure tight manner inside of a housing 62 having a lower channel portion and a cover 63. The lower housing portion has a flange 62'. The upper cover also has a flange 63'. Both flanges extend all around the housing and the membrane 61 is clamped between these flanges by means of a plurality of screws extending through the flanges but not shown in detail. Thus, between the membrane 61 and the cover 63 a space 65 is confined into which a pressure medium may be introduced through an inlet port 64 forming part of the means for deforming the membrane. The port 64 is connected to a hydraulic or pneumatic source of pressure not shown. If a pressure is introduced into the space 65 the membrane 61 will yield downwardly thereby displacing a pressure plate 66 resting directly against the membrane 61. The pressure transmitting plate 66 is form fitted inside the lower portion of the housing 62 whereby it is slidable up and down inside the housing. The pressure plate 66 is secured to the top ends of force transmitting members or rods 71 by means of screws of 71'. The rods 71 are guided in bearing sleeves 73 secured, for example, by welding, to the bottom 72 of the housing portion 62. To facilitate the gliding between the rods 71 and the sleeve bearings 73 the latter may be provided with a suitable lining 73' as is known in the art. A stop screw 68 with a stop nut 68' limits the downward stroke of the membrane 61. A buffer 69, for example, of neoprene or the like may be secured to the downwardly facing surface of the pressure plate 66 for contacting the upper end of the stop screw 68. A reset spring 67 returns the pressure plate 61 and the components connected thereto into the starting position illustrated in FIG. 6.

The membrane 61 is a rubber skin or it may be made of a suitable synthetic material. The shape of the membrane 61 and thus also the cross section of the housing 62, 63 are adapted to the shape of the strip steel stamping knife 70 with its cutting edge 70'. As shown in FIG. 7, the knife is bent into the shape of a rectangle and the surface area of the membrane 61 corresponds substantially to the surface area of the rectangle. This feature of the invention has the advantage that even for very low pressures, for example, in the order of about 5 bar in the chamber 65 a sufficient cutting pressure is obtained along the knife edge 70' because the surface area of the cutting edge is substantially smaller than the surface area of the membrane 61. The number of the spacer members 71 and their arrangement, especially their spacing from each other are chosen in accordance with the shape of the knife 70. The cross sectional view as shown in FIG. 6 will be substantially the same even if the knife configuration should deviate from the rectangular configuration shown in FIG. 7. Thus, the substantially horseshoe shaped configuration of the strip steel stamping knife 76 shown in FIG. 8 may be attached to an apparatus shown in FIG. 6. However, the housing configuration will be adapted to the knife configuration as illustrated in FIG. 8.

Figure 8:
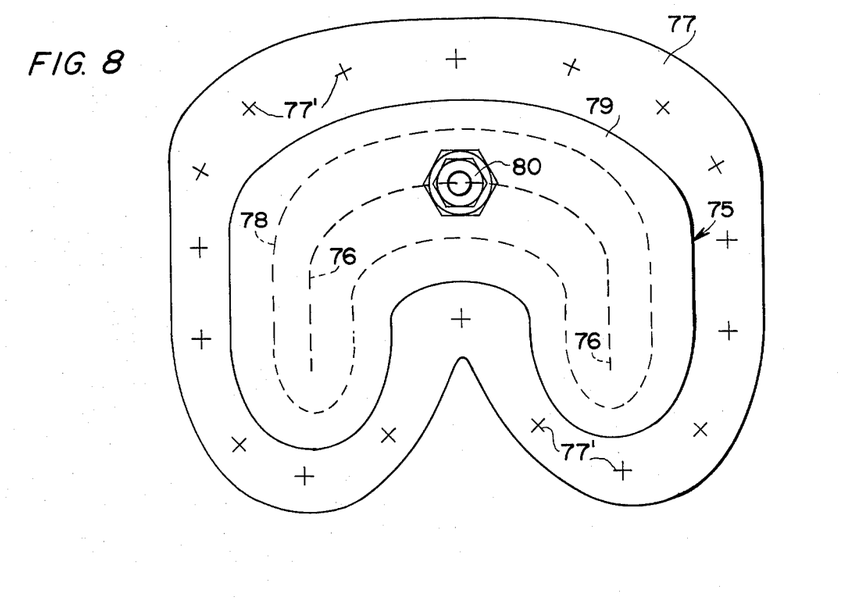
FIG. 8 is a top plan view similar to that shown in FIG. 7, however, illustrating a tool configuration somewhat similar to that of a horseshoe.

FIG. 8 shows that both the bottom member of the housing and the cover 75 of the housing are adapted to the shape of the knives 76. The housing portions are again provided with flanges 77 held together by screws 77' to clamp a membrane tightly in position to form a space 79 which may be filled with fluid under pressure through a port 80 extending through the cover 75. The knife holder 78 shown in dashed lines in FIG. 8 also has the configuration of the U-shaped knife and may be carried by a number of spacer members as shown in FIG. 6. Stroke limiting means may also be used in the apparatus of FIG. 8.

Although the knife configuration in the embodiment of FIG. 8 is somewhat more complicated than in FIGS. 6 and 7, it is nevertheless possible to exactly calculate all the components even for more involved knife configurations. The shape of the housing in FIG. 8 minimizes the quantity of pressure medium required for developing the necessary pressure.

The above mentioned exact calculation of all the components is possible because the necessary cutting force effective at the strip steel stamping knife is known in terms of pressure required for each length unit of the knife and depending on the material to be severed. Since the pressure necessary for displacing the strip steel knife 76 is applied to a pressure plate having a length substantially corresponding to that of the knife 76 and having substantially the same shape as the knife 76, all computing quantities may be ascertained in a simple manner. Thus, the production of the pressure plate and of the housing 75 including its cover with the aid of a computer controlled laser does not pose any problems because the laser is easily guided along the necessary contours for cutting the pressure plate and the upper and lower housing components from a suitable material such as plexi-glass. The computer controlled cutting of the pressure plate and the housing components assures that the shape of the pressure plate conforms to that of the housing. However, the components may also be made by more conventional machine tool shaping.

Figure 9:
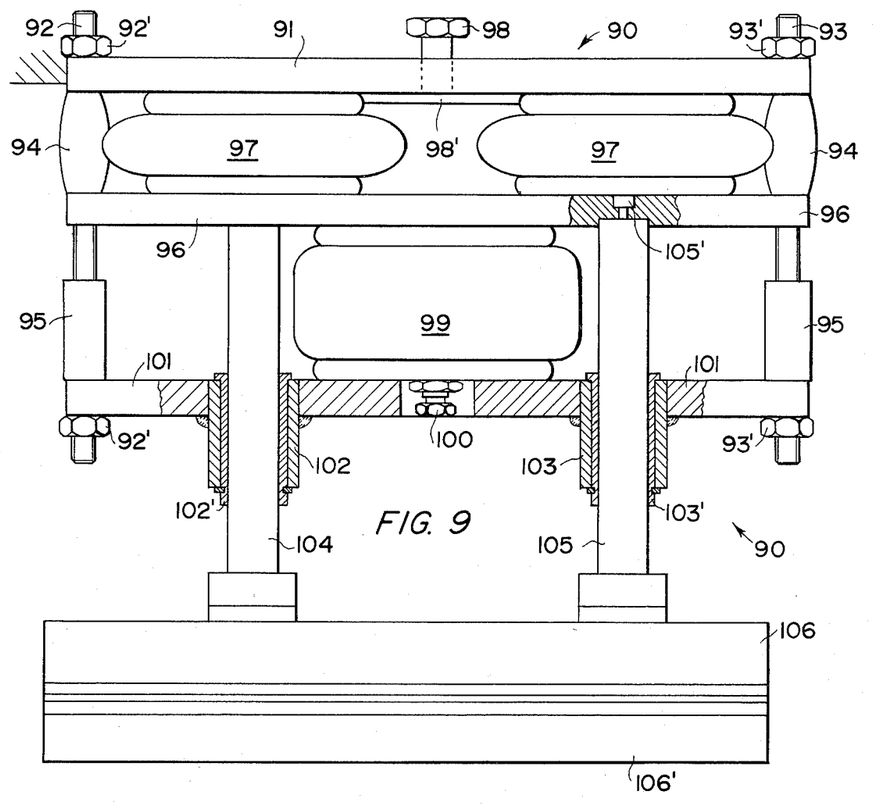
FIG. 9 is a sectional side view of an apparatus similar to that of FIG. 6, however, illustrating reset means which also employ an expansion member.

FIG. 9 illustrates an apparatus 90 including a frame structure with three plates 91, 96, and 101. The frame structure is connected to a machine frame not shown. The upper frame plate 91 and the lower frame plate 101 are rigidly interconnected by guide rods 92 and 93 carrying spacer members 94 and 95. The pressure plate 96 is vertically movable between the upper spacer members 94 and the lower spacer members 95. Expandable hose members 97 are interposed between the upper frame plate 91 and the displaceable pressure plate 96. A medium under pressure is supplied into the hose members 97 through a port 98 and conduit means 98'. Below the force transmitting pressure plate 96 there is arranged a further expandable hose member 99 which may also be supplied with a pressure medium through a port 100 for supplying a reset force to return the pressure plate 96 into its uppermost position shown in FIG. 9. The reset deformable pressure member 99 rests on the lower frame plate 101 and presses against the force transmitting pressure plate 96 which is slidable up and down along portions of the guide rods 92, 93 between the spacer members 94, 95. The length of the spacer members 95 limits the downward stroke of the expansion of the hose members 97. The length of the upper spacer member limits the reset stroke of the expandable hose member 99. Further, by adjusting the nuts 92' and 93' the stroke length may also be precisely adjusted.

The force or rather the pressure resulting from the expansion of the hose members 97 is transmitted through the pressure plate 96 to the knife carrier 106 through spacer and guide rods 104 and 105. The upper ends of these rods are secured to the pressure plate 96, for example, by screws 105'. Further, the rods 104, 105 are guided in sleeve bearings 102 and 103, for example, welded to the lower frame plate 101 and provided with friction reducing liners 102', 103' as are known in the art. The guide sleeve bearings 102 and 103 make sure that the pressure resulting from the expansion of the members 97 is transmitted to the knife carrier 106 in a synchronous and precisely parallel manner without any canting. The knife carrier 106 supports a strip steel knife 106' in a conventional manner.

The operation of the apparatus of FIG. 9 is substantially the same as has been described above. However, it should be mentioned that the expandable hose member 99 may be substantially smaller than the expandable hose members 97 because the forces required for the resetting of the elements are smaller than the forces required for the cutting operation. Basically, even the pressure medium flowing out of the deformable member 97 may be used for the return stroke to expand the hose member 99. For this purpose port connections and valve means would be provided between the member 97 and the member 99. The latter would have an outlet constituting part of the return flow circuit.

Figure 10:
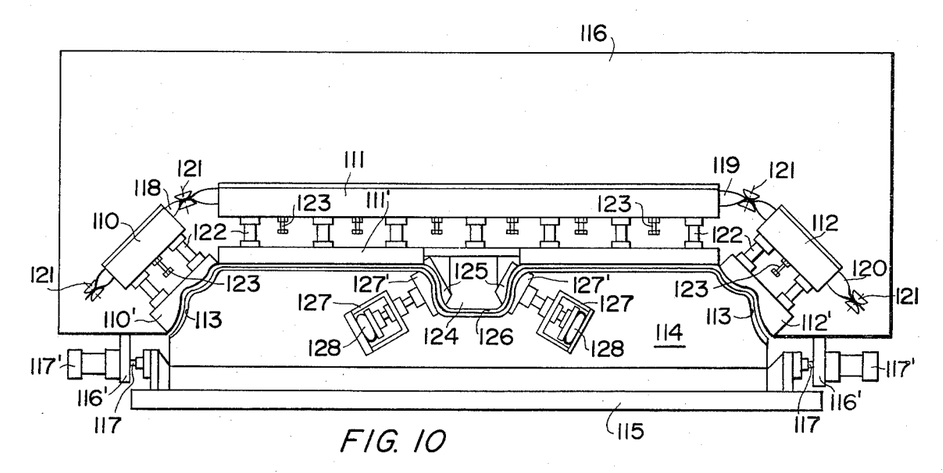
FIG. 10 is an elevational side view of an apparatus according to the invention adapted for three-dimensional cutting of a work piece whereby a plurality of separate expansion members are arranged for carrying the tools, and wherein counter holding means are also equipped with expansion members according to the invention, whereby the latter are supported on a lifting table.

FIG. 10 illustrates an embodiment of the present invention in which three separate force applying sections or units 110, 111, and 112 are arranged for simultaneous and/or sequential cooperation in the stamping of a three-dimensional work piece 113 supported on a respectively shaped three-dimensional mold 114 which in turn is supported on a table structure 115 which may be raised or lowered by a scissor frame as is disclosed in more detail in my copending application: U.S. Ser. No.: 965,745 filed of even date. The table 115 may be locked in its uppermost working position as shown in FIG. 10 to the exchangeable tool frame 116 by power operated locking bolts 117 reaching into respective recesses in the table structure. The locking bolts 117 may be operated hydraulically or pneumatically by respective piston cylinder means 117' rigidly connected to the exchangeable tool frame 116 through brackets 116'.

Each section 110, 111, 112 comprises its respective knife carrier 110', 111', 112'. The stamping pressure may be supplied to each section through respective hose sections 118, 119, and 120. One continuous hose may be employed or separate hose sections may be used. The respective clamps 121 separate the hose sections from each other. Each hose section is provided with its respective port means not shown for simplicity's sake. Each force applying section 110, 111, 112 has its own extension members 122, and stroke limiting elements 123. A central knife carrier 124 may be part of section 111 which also may include stationary knife carriers 125. The stationary knife carriers 125 cooperate with movable counter pressure means 127 including counter holder carriers 127'. The movable carrier knife 124 cooperates with a depression 126 in the mold 114. The movable counter holder means 127 may be constructed as illustrated in FIG. 5. The operation of the apparatus shown in FIG. 10 is the same as described above, for example, with reference to FIGS. 1 and 5.

In the embodiment of FIG. 10 the hose sections 118, 119 and 120 as well as the hose sections 128 of the counter holder means 12 could be replaced by flexible membrane means as described above.

Figure 11:
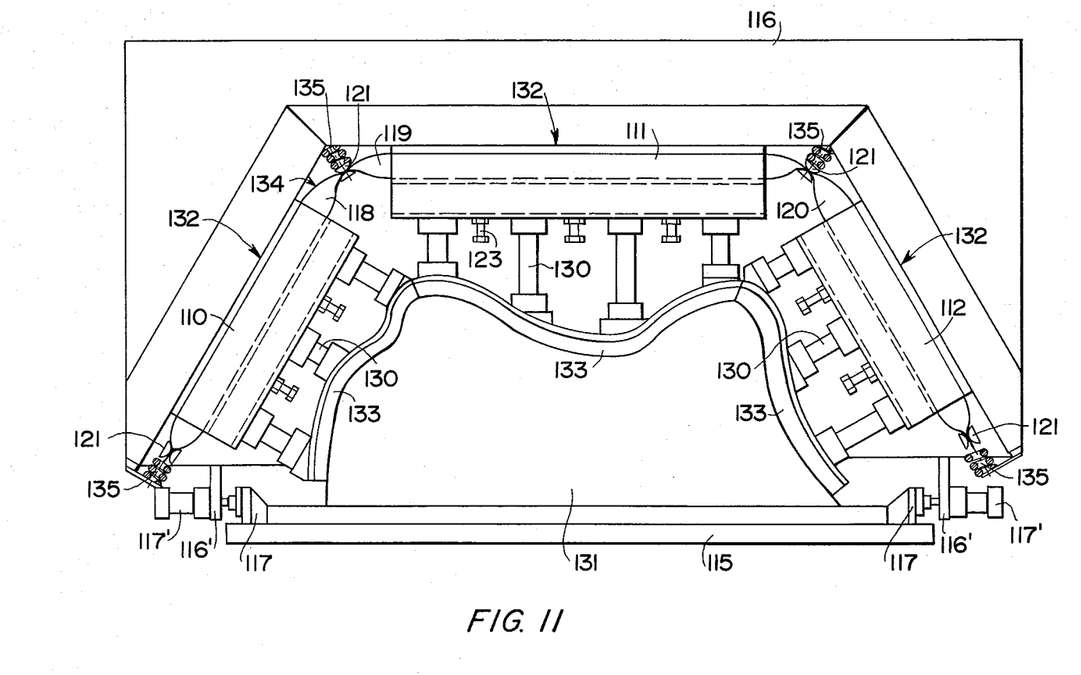
FIG. 11 is also an elevational side view of an apparatus according to the invention for three-dimensional cutting, wherein the counter holding means have the desired contour and are supported on a lifting table.

FIG. 11 illustrates an apparatus quite similar to that of FIG. 10, however, the force transmitting components 130 are adapted in their length to the particular requirements of the three-dimensional shape of the mold 131. In addition, the frame structure includes a separate support beam 132 to which the respective pressure producing section 110, 111, 112 is secured. The use of such a sub-frame 132 has the advantage of facilitating the placing of the several pressure producing sections in positions which accommodate the three-dimensional shape of the mold or work piece 131. The strip steel knife members 133 are also shaped in accordance with the requirements of the mold or work piece 131.

To the extent that the same components are involved in FIG. 11 as in FIG. 10, the same reference numbers are used and the same description applies. The single hose 134 is installed so as to extend through all three housings of the sections 110, 111 and 112. The ends of the continuous hose 134 are clamped as described by the clamps 121. The same applies for the hose portions intermediate the adjacent sections. In addition, springs 135 are provided at the ends of the hose 134 and intermediate the housing portions to stretch the hose and keep it in the proper location. The charging of a pressure medium into the hose sections comprises respective port means as disclosed in some of the other figures but not shown in FIGS. 10 and 11 for simplicity's sake. The separate charging of the hose sections has the advantage that each of the respective sections may be operated independently of any of the other sections, thus avoiding any interference between the sequentially operated tools. Where the shape of the work piece permits, the tools may be operated simultaneously.

Figure 12:
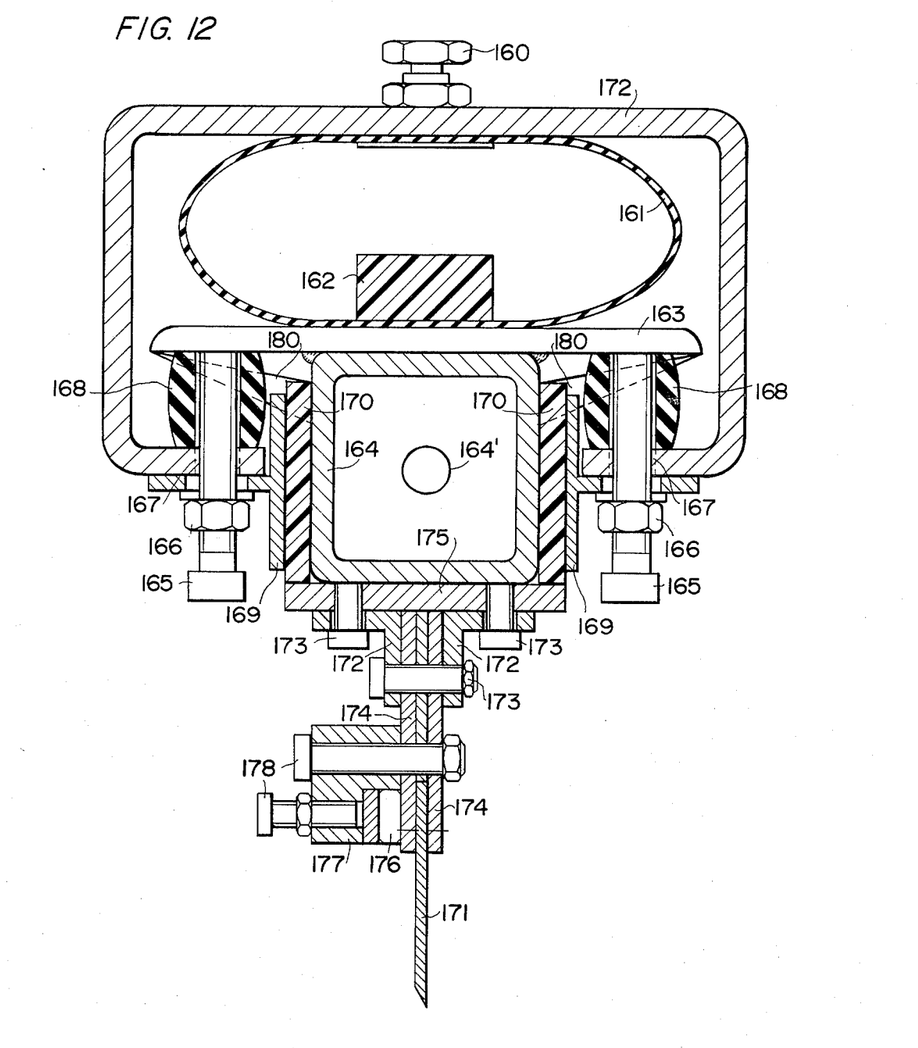
FIG. 12 is a sectional view similar to that of FIG. 1, however, illustrating cooling means for the expandable member which cooling means act simultaneously as guide means for the force transmitting elements, and wherein the expandable member is shown in the fully inflated condition, whereby the force transmitting plate rests on stop members.

FIG. 12 illustrates an embodiment according to the invention which is provided with cooling means. The expandable hose member 161 is located in a channel shaped housing or frame member 172 and a pressure medium may be supplied through port means 160. A stopper of synthetic material 162 is arranged inside the hose 161 whereby the latter cannot completely collapse when a pressure medium is withdrawn from the hose 161.

The force transmitting means comprise a pressure transmitting plate 163, the upper surface of which is in direct contact with the expandable hose 161 and the lower surface of which cooperate with further force transmitting elements as well as with reset and stroke limiting means. The force transmitting means include a tubular member 164 which may be welded to the pressure plate 163 and which according to the invention function simultaneously as a cooling system. For this purpose the tubular member 164, which may have a square cross section, is provided with coolant port means 164' through which coolant may flow into and out of the tube 164. Additional brackets 180 are welded to the plate 163 and to the tube 164 to provide a sturdy construction. The brackets 180 are located intermediate the guide means and intermediate the stop means which will now be described.

The stroke limiting means comprise screw bolts 165 and counter-nuts 166. The housing 172 has a C-shape and the bolts 165 extend through threaded holes 167 along the free edges of the C-shaped housing 172. By adjusting the screws 165 and nuts 166 the stroke length may be limited because the pressure plate 163 will be stopped by the upper free ends of the threaded bolts 165 as shown in FIG. 12 illustrating the maximum downstroke position.

In the shown position the elastically compressible expansion members 168 are compressed and will return the pressure plate 16 and the force transmitting means attached thereto into a starting position as soon as the pressure inside the expandable member 16 is released.

The guide means comprise T-sections 169 which are held in place by the above mentioned bolts 165 and nuts 166. Friction reducing inserts 170 are interposed between the inwardly facing surfaces of the guide members 169 and the laterally outwardly facing surfaces of the force transmitting tube 164. The friction reducing strips 170 may, for example, be TEFLON (RTM) strips.

The force transmitting elements comprise, in addition to the above mentioned tube 164 the means for connecting the knife 171 to the tube 164 such as brackets 172, screws 173, and plates 174, as well as a spacer plate 175. The plates 174 which clamp the knife 171 also hold a heating element 176 through a bracket 177 and screws 178.

The apparatus shown in FIG. 12 operates substantially in the same manner as the apparatus shown in FIG. 1. However, a more precise guiding is accomplished in FIG. 12 by the tube 164 and guide sections 169. In addition, the hose 161 in FIG. 12 is insulated from any heat that may develope due to the heating elements 176 for the knife 171.

Figure 13:
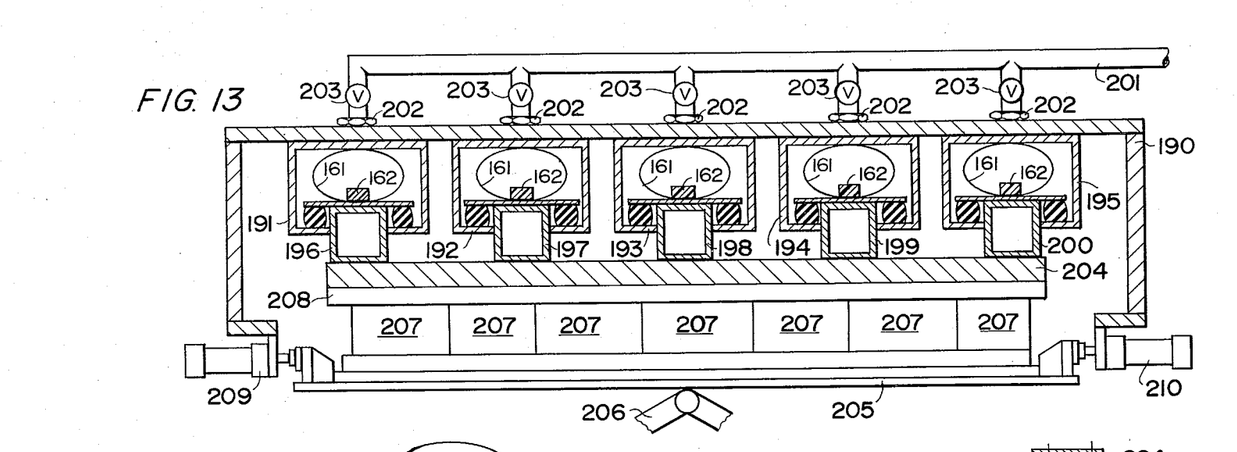
FIG. 13 is a sectional view through a plurality of force application devices similar to those shown in FIG. 12 and arranged in parallel to provide a surface type of force application wherein a lifting table forms the counter support means for a work piece, and wherein a scissor type of cut may be accomplished.

FIG. 13 shows a sectional view through an embodiment wherein a plurality of force applicating devices 191, 192, 193, 194 and 195 are supported in a common frame or housing 190 in parallel to each other for the purpose of obtaining a surface type of force application through the force transmitting elements 196, 197, 198, 199 and 200. The individual force transmitting units are constructed substantially as described above with reference to FIG. 12. Preferably, all the units are supplied with a pressure medium through a common conduit 201 connected to manifold ports 202 which are in turn connected to the respective expandable hose members 161 as shown in FIG. 13. Valve means 20 are located in the manifold conduits branching off from the pressure supply line 201. These valves 203 may be hand operated, however, preferably they may be magnetically operated valves so that the pressure application may be sequentially to successive portions of the surface area of a plate 204 connected to the force transmitting tubes 196 to 200. This feature of the invention has the advantage that a scissor type cut may be accomplished by sequentially pressurizing the hose members 161. Another advantage of the embodiment of FIG. 13 is seen in that the work piece support table 205 which may be raised and lowered for example, by a scissors frame 206 is not required to take up the entire pressure load at the same time unless such loading is desired by the appropriate adjustment of the valves 203. A plurality of strip steel knife patterns 207 may be supported on the table 205 and the work piece 208 may be pressed against these knife patterns 207 by the force transmitting plate 204. As described above with reference to FIGS. 10 and 11, the table 205 may also be lockable to the frame structure 190 by respective power operated locking 209 and 210. The operation is otherwise the same except that in FIG. 13 the additional advantage is obtained that a scissor type cut may be accomplished.

Figure 14:
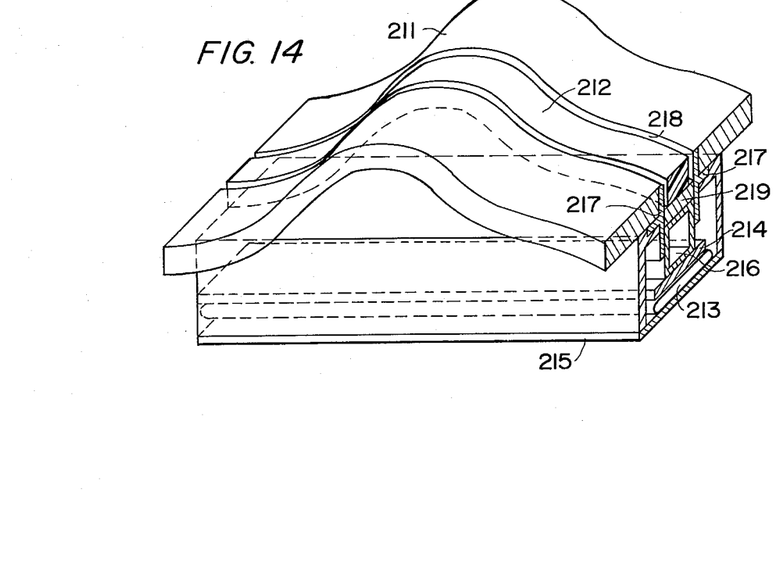
FIG. 14 is a perspective, elevational view of a counter holder or mold according to the invention for cutting along a three-dimensional curve.

FIG. 14 illustrates a three-dimensionally shaped work piece supporting mold 211 having a movable portion 212 acting as a counter support which is operated by expanding the expansion hose member 213 which also may be a membrane as described above. The expansion of the member 213 is transmitted through a pressure plate 214 in a housing 215 through a tubular member 216 guided between two lateral guide plates 217. The counter-holder member 212 is operatively held in a groove 218 and may be made of TEFLON or the like for replacement when the insert counter-holder 212 has been used up after prolonged and repeated contact with a correspondingly shaped strip steel knife not shown. An intermediate plate 219 may be inserted between the tubular member 216 and the counter-holder insert 212. The intermediate plate 219 would then also slide up and down with the tubular member 216 as the latter is pushed up by the expansion of the hose member 213. The counter holder structure of FIG. 14 may also be provided with reset means as disclosed in connection with some of the other figures however not shown for simplicity's sake in FIG. 14.

Figure 15:
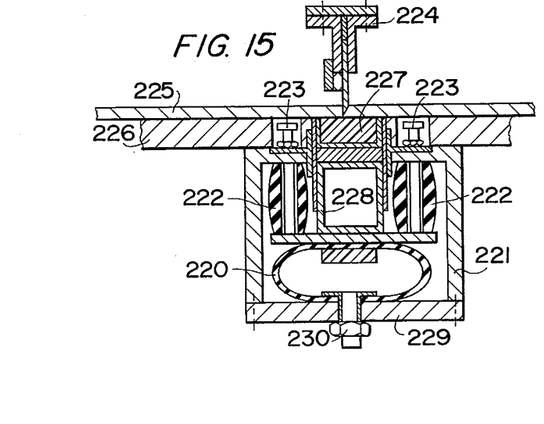
FIG. 15 is a view similar to that of FIG. 12, however, illustrating the present apparatus as a counter holding device cooperating with a knife means.

FIG. 15 illustrates a structure similar to that shown in FIG. 12 however constructed as a counter-holder device comprising an expandable tubular member 220 in a housing 221 resettable by rubber elastic bodies 222. The stroke is adjustable by respective nuts and bolts 223. The knife structure 224, which may be stationary, penetrates the work piece 225 supported on a support table 226 through which the counter-holder insert 227 extends into contact with the work piece 225 which may be a piece of carpet or other sheet material such as fabric or the like. The insert 227 is made of a plastic replaceable material such as a TEFLON (RTM) strip or the like.

Guide means preferably of the friction reducing kind are provided between the sides of the tubular member 228 and the edges of the housing 221 substantially in the manner as described above with reference to FIG. 12. The bottom 229 of the housing is preferably removably secured to the housing 221 for maintenance and service. The flexible expandable hose member 220 may be pressurized through an inlet port 230. A coolant may blow through the tubular member 228. However, since the knife structure 224 is more remote from the expandable hose member 220, such cooling may not be necessary.

Figure 16:
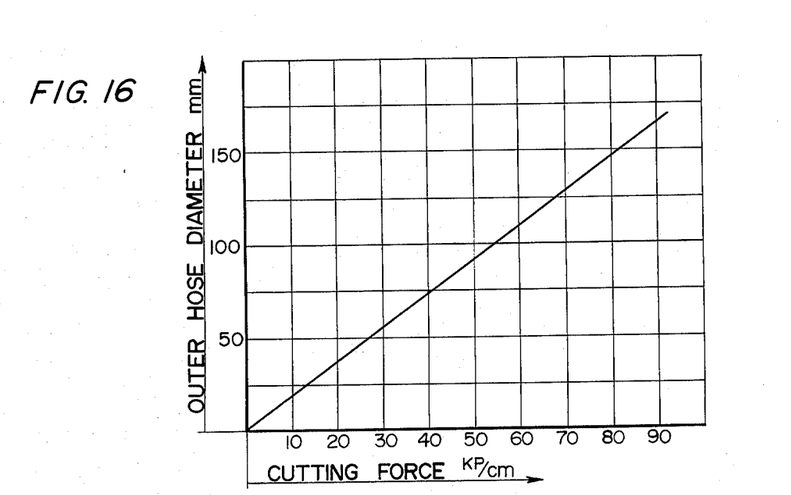
FIG. 16 is a graph showing the outside diameter of an expandable hose member used according to the invention, as a function of the required cutting force.

FIG. 16 shown on the same sheet as FIG. 8 illustrates a diagram in which the outer diameter of the expandable hose member is plotted as a function of the required cutting force. The required cutting force is usually known as an experience value depending substantially on the type of material to be cut. With the known cutting force it is possible to directly select the respective hose diameter. In this connection it is also an advantage of the invention that the chambers in the frame structure may be so dimensioned that hose members of different sizes may be accommodated therein.

The invention is not limited to the particular embodiments illustrated and described. For example, the invention is also suitable as a clamping device for holding work pieces in place along predetermined lines and/or curves. The feature or features which are common to all embodiments of the invention are seen in the use of at least one hydraulically or pneumatically pressurized, deformable member which is movable against a pressure plate for transmitting the expansion force to a tool such as a counter-holder, clamping member, or cutting knife, whereby reset elements and stroke adjustment elements may also be used.

Although the invention has been described with reference to specific example embodiments, it will be appreciated, that it is intended, to cover all modifications and equivalents within the scope of the appended claims.

What is claimed is:

1. An apparatus for applying force to a three-dimensional work piece, comprising a plurality of work performing means each including rigidly supported frame means forming a plurality of hollow housing members, longitudinal, elastically deformable expansion means having a longitudinal axis, said expansion means being operatively supported in said hollow housing members, elongated force transmission means (24) operatively arranged in each housing member for cooperation with said longitudinal, elastically deformable expansion means, pressure means operatively connected to said longitudinal elastically, deformable expansion means for expanding said expansion means along its entire length to perform a work stroke which is applied to said work piece along a line curved in space, at least two power transmitting rods operatively secured to said elongated force transmission means in a row extending substantially in the same plane as said longitudinal axis, whereby all power transmitting rods are operated in synchronism in said row, said power transmitting rods extending through said housing member, guide means secured to said housing member for guiding said power transmitting rods for a back and forth movement substantially perpendicularly to said housing member, reset means operatively arranged to return said power transmitting rods to a rest position when the pressure in said elastically deformable expansion means is released and support means for operatively supporting said plurality of work performing means in a three-dimensional relationship relative to each other for performing work on a three-dimensional work piece.

2. The apparatus of claim 1, further comprising three-dimensional mold means for holding said three-dimensional work piece, and tool means operatively connected to said power transmission rods for movement relative to said three-dimensional mold means in a direction substantially perpendicularly to a work piece surface to be cut.

3. The apparatus of claim 2, comprising further work performing means operatively arranged inside or below said three-dimensional mold means, said further work performing means including further tool means also arranged for movement relative to said three-dimensional mold means.

4. The apparatus of claim 3, wherein at least some of said tool means and further tool means comprise counter holder means.

5. The apparatus of claim 1, wherein said power transmitting rods have different lengths.

6. The apparatus of claim 1, further comprising tool means, such as strip steel knife means, operatively connected to said power transmitting rods for cooperation with said force transmission means.

7. The apparatus of claim 1, wherein said longitudinal, elastically deformable expansion means comprise a hollow flexible body, such as a hose.

8. The apparatus of claim 1, wherein said elongated force transmission means comprise a force transmitting plate, and means guiding said force transmitting plate for movement in said frame means.

9. The apparatus of claim 8, wherein said elastically deformable expansion means extend substantially along the entire length of said force transmitting plate.

10. The apparatus of claim 1, wherein said elongated force transmission means constitute support wall means against which said longitudinal, elastically deformable expansion means rest at least along one side thereof, and wherein said reset means are operatively inserted between said housing member and said longitudinal, elastically deformable expansion means for returning the latter into a starting position following a work stroke.

11. The apparatus of claim 10, wherein said reset means comprise at least one elastically deformable component.

12. The apparatus of claim 1, wherein said force transmitting means are arranged in direct contact with said longitudinal, elastically deformable expansion means.

13. The apparatus of claim 1, further comprising stop means operatively arranged in said frame means for cooperation with said elastically deformable expansion means to limit the work stroke of the latter.

14. The apparatus of claim 1, further comprising counter support means operatively connected to said force transmission means for movement therewith, whereby said counter support means are operable by said longitudinal, elastically deformable expansion means.

15. The apparatus of claim 1, wherein said longitudinal, elastically deformable expansion means comprise hose means, said apparatus further comprising means operatively connected to said hose means for flowing a cooling medium through said hose means.

16. The apparatus of claim 1, wherein said longitudinal, elastically deformable expansion means comprise hose means, said apparatus further comprising stop means arranged inside said hose means for limiting the stroke of said elastically deformable hose means.

17. The apparatus of claim 1, wherein said plurality of work performing means are arranged in such a spacial relationship to one another that said line curved in space is substantially an endless, closed line (FIG. 10).

18. An apparatus for applying force to a work piece along a line curved in space, comprising elongated tool means shaped to substantially conform to said line curved in space, a plurality of work performing means, each work performing means including rigidly supported frame means, forming at least one hollow housing member, longitudinal, elastically deformable expansion means having a longitudinal axis, said expansion means being operatively supported in said hollow housing member, elongated force transmission means (24) operatively arranged in said housing member for cooperation with said longitudinal, elastically deformable expansion means, pressure means operatively connected to said longitudinal, elastically deformable expansion means for expanding said expansion means along its entire length to perform a work stroke which is applied to said work piece, at least two power transmitting rods operatively secured at one end of each rod to said elongated force transmission means to form a row of rods which row extends substantially in the same plane as said longitudinal axis, means securing said other end of each rod to said tool means, at least some of said securing means comprising spacer means operatively interposed between the tool means and the respective other end of the rod, whereby all power transmitting rods are operated in synchronism in said row and to an extent defined by said line curved in space, said power transmitting rods extending through said housing member, guide means secured to said housing member for guiding said power transmitting rods for a back and forth movement substantially perpendicularly to said housing member, and reset means operatively arranged to return said power transmitting rods in unison to a rest position when the pressure in said elastically deformable expansion means is released, whereby the uniform expansion of said expansion means is transmitted to different extents due to said rods of different length.

19. The apparatus of claim 18, wherein said rods have different lengths.

* * * * *

UNITED STATES PATENT AND TRADEMARK OFFICE
CERTIFICATE OF CORRECTION

PATENT NO. : 4,277,996

DATED : July 14, 1981

INVENTOR(S) : Ernst M. Spengler

It is certified that error appears in the above-identified patent and that said Letters Patent is hereby corrected as shown below:

Claim 18, Column 14, line 57, replace "said rods of different length." by --said spacer means.--.

Signed and Sealed this

Eighteenth Day of November, 1986

Attest:

DONALD J. QUIGG

Attesting Officer

Commissioner of Patents and Trademarks